(12) United States Patent
Su

(10) Patent No.: US 7,628,046 B2
(45) Date of Patent: Dec. 8, 2009

(54) STEERING WHEEL LOCK

(75) Inventor: Wen-Chyun Su, No. 5, Aly. 3, Ln. 88, Wuchuan Rd., Shenkang Hsian, Taichung Hsien (TW)

(73) Assignees: Pei-Yuan Yang, Chihu Chen (TW); Wen-Chyun Su, Shenkang Hsiang (TW)

( * ) Notice: Subject to any disclaimer, the term of this patent is extended or adjusted under 35 U.S.C. 154(b) by 511 days.

(21) Appl. No.: 11/457,250

(22) Filed: Jul. 13, 2006

(65) Prior Publication Data

US 2007/0074549 A1  Apr. 5, 2007

(30) Foreign Application Priority Data

Sep. 30, 2005  (TW) .............................. 94216893 U

(51) Int. Cl.
*B62H 5/04* (2006.01)
*B60R 25/02* (2006.01)

(52) U.S. Cl. .............................. 70/209; 70/163; 70/225; 70/237

(58) Field of Classification Search ................... 70/159, 70/163, 209, 237, 210–212, 225–226, 238
See application file for complete search history.

(56) References Cited

U.S. PATENT DOCUMENTS

| 5,092,146 | A | * | 3/1992 | Wang | 70/209 |
| 5,174,138 | A | * | 12/1992 | Shen | 70/209 |
| 5,284,037 | A | * | 2/1994 | Chen et al. | 70/209 |
| 5,718,133 | A | * | 2/1998 | Chen et al. | 70/209 |
| 5,921,120 | A | * | 7/1999 | Wu | 70/209 |
| 6,282,930 | B1 | * | 9/2001 | Strauss et al. | 70/209 |
| 6,334,345 | B1 | * | 1/2002 | Lee | 70/209 |
| 6,539,758 | B2 | * | 4/2003 | Meekma et al. | 70/209 |
| 6,694,784 | B2 | * | 2/2004 | Wu | 70/209 |

* cited by examiner

*Primary Examiner*—Suzanne D Barrett
*Assistant Examiner*—Christopher Boswell
(74) *Attorney, Agent, or Firm*—Alan Kamrath; Kamrath & Associates PA

(57) ABSTRACT

A steering wheel lock has a hollow locking shaft with two hooks, a locking base slidably mounted on a middle section of the locking shaft and having a bar corresponding to the two hooks, a retractable rod engaged the locking rod and having a positioning device at one end and a loop lock at the other end, and an interior shaft received inside the retractable rod and having an abutting head at one end and a clamping device at the other end. Thereby, the positioning device is secured by the clamping device on the interior shaft in a normal condition so that the retractable rod is temporarily held. Moreover, the loop lock and the hooks on the locking rod respectively and detachably mount on two opposite sides of the steering wheel to provide excellent burglarproof efficiency.

8 Claims, 11 Drawing Sheets

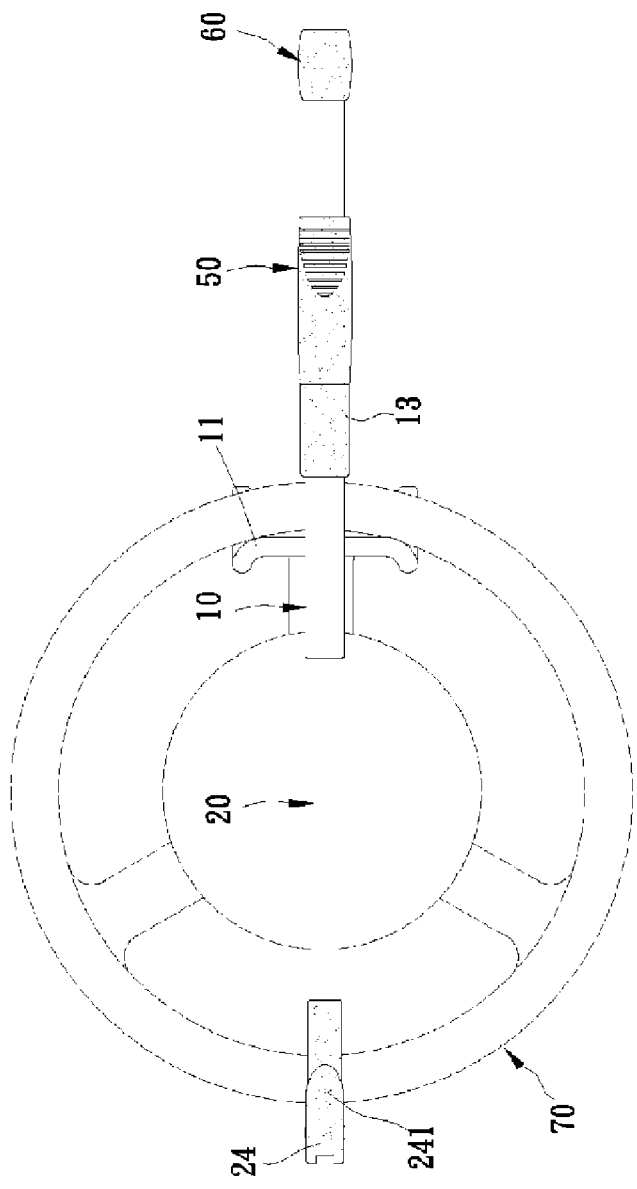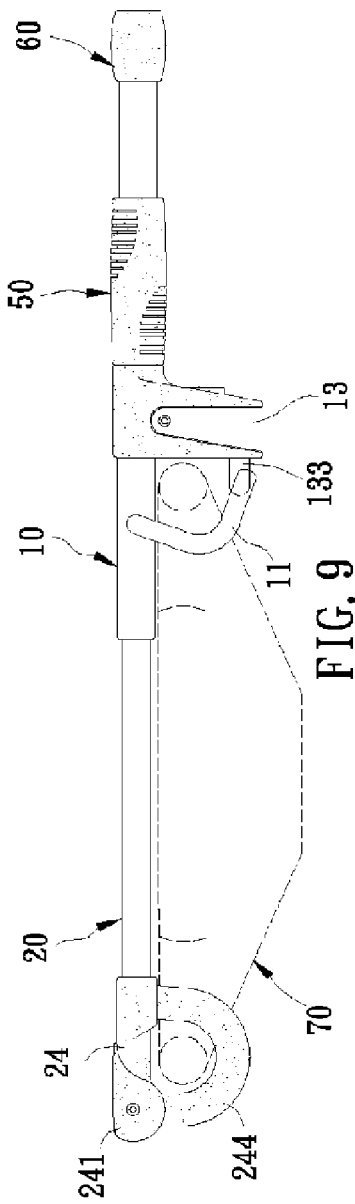
FIG. 9A
FIG. 9

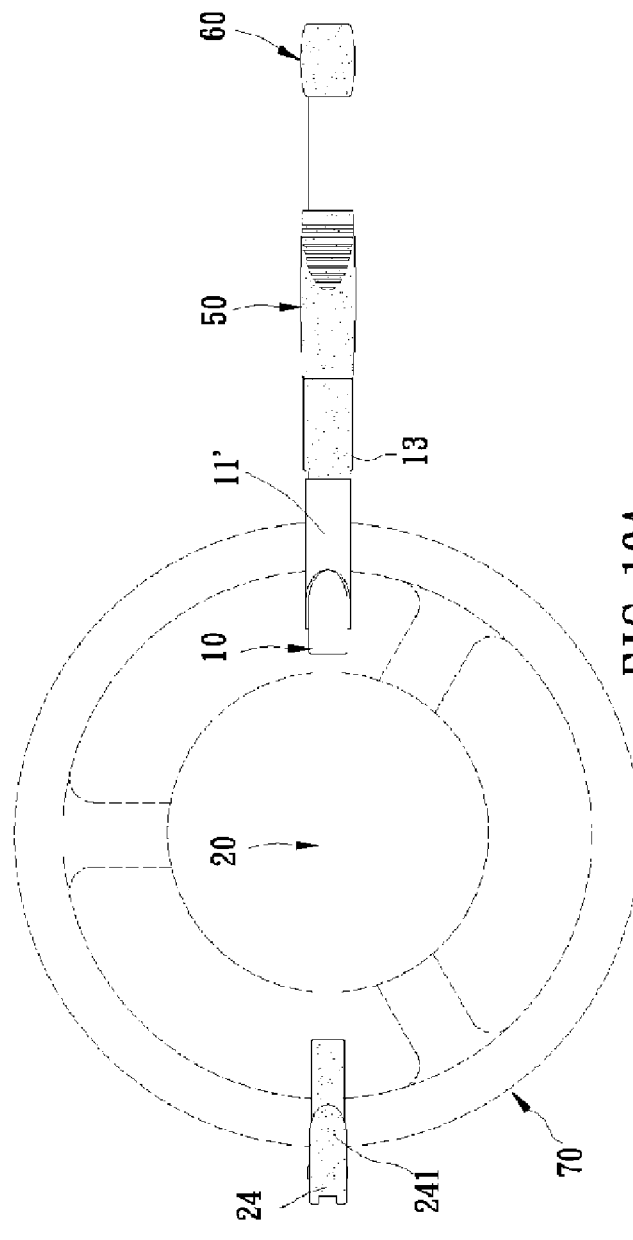
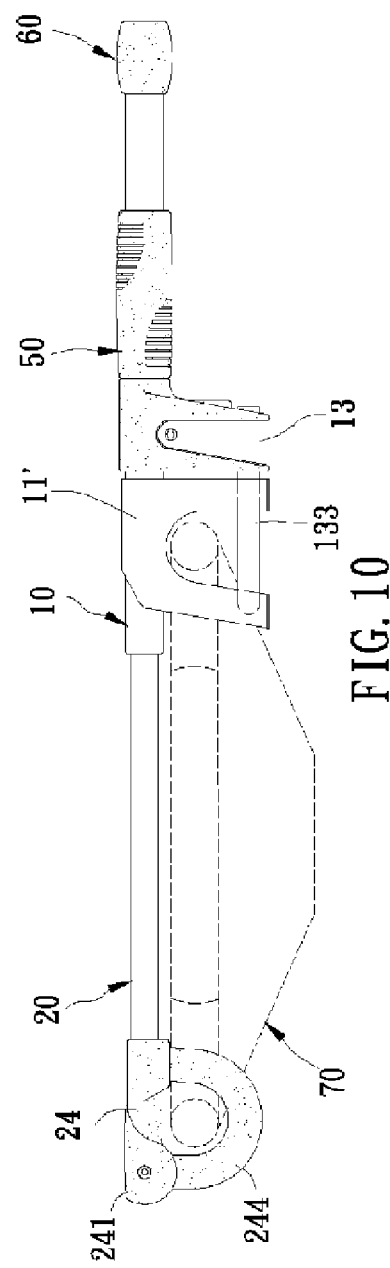
FIG. 10A
FIG. 10

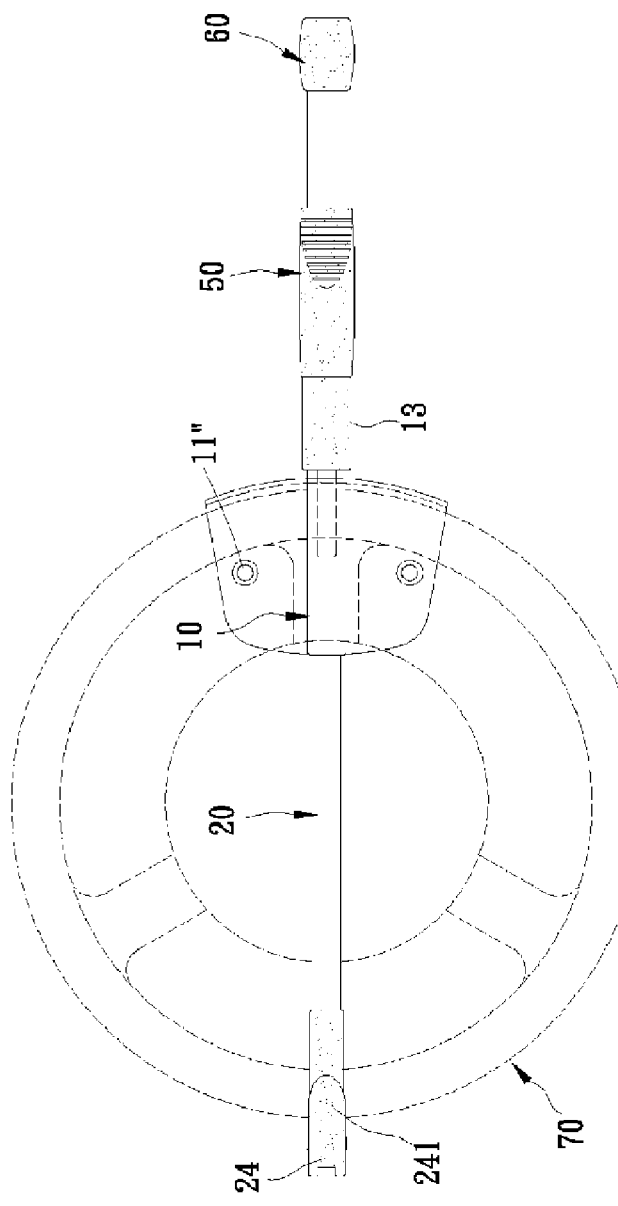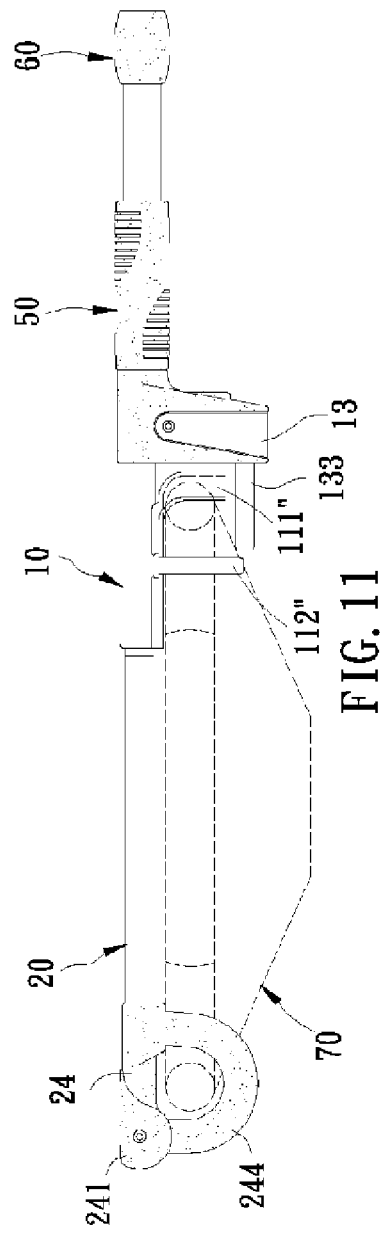
FIG. 11A
FIG. 11

STEERING WHEEL LOCK

BACKGROUND OF THE INVENTION

1. Field of the Invention

The present invention relates to a steering wheel lock and, more particularly, to a steering wheel lock that is convenient in use and efficiently resistant to hammering detachment to provide an excellent burglarproof efficiency.

2. Description of Related Art

A burglarproof device for a car is mostly achieved by locking the steering wheel to limit operation of the steering wheel. One conventional steering wheel lock is a cap-type lock that covers a great portion of the steering wheel and particularly protects the airbag embedded inside the steering wheel from being stolen. However, the cap-type lock has a complex structure and has a high manufacturing cost so that the price is correspondingly high. Moreover, using and storing the cap-type lock are inconvenient, because the cap-type lock is heavy and space-consuming.

Another conventional steering wheel lock as shown in FIG. 1 is a simple stick-typed one and comprises a locking rod 1 and a retractable rod 2. The locking rod 1 has a lock base 1a and two hooks 1b extending downward. The retractable rod 2 is longitudinally and retractably received inside the locking rod 1 and has multiple recesses 2a defined on its periphery and has two hooks 2b extending downward. When this steering wheel lock mounts on the steering wheel, the hooks 1b, 2b on both of the locking rod 1 and the retractable rod 2 oppositely engage two sides of the steering wheel and firmly clamp the steering wheel for burglarproof purposes.

However, the simple stick-typed conventional steering wheel lock still has the following drawbacks:

The conventional, stick-type steering wheel lock is usually unlocked when not mounted on the steering wheel so that the retractable rod 2 slides easily and causes inadvertent bumps to users or surplus space occupation inside the car. Moreover, a key is necessary to lock the retractable rod 2 to the locking rod 1 so that operation of the conventional steering wheel lock is troublesome.

Because keeping engagement of the locking rod 1 and the retractable rod 2 stable is simply achieved by engaging a pin (not shown) inside the locking base 1a to the recess 2a on the retractable rod 2, violent hammering along the axis of the stick-typed steering wheel lock disengages the pin from the recess 2a or breaks the pin easily. Therefore, the stick-typed steering wheel lock can not provide excellent burglarproof efficiency when burglars hammer it correctly.

SUMMARY OF THE INVENTION

A main objective of the present invention is to provide a steering wheel lock that can be locked without using a key and has a clamping device to keep the retractable rod from sliding when the steering wheel lock is unlocked.

Another main objective of the present invention is to provide a steering wheel lock that has two independent units adapted to hold two opposite sides of a corresponding steering wheel so that axially violent hammering can be compensated directly by the steering wheel without damaging the steering wheel lock.

To achieve the foregoing objectives, the steering wheel lock comprises:

a locking rod which is hollow and has two ends, with a pin hole defined in a middle of the locking rod, with a locking base slidably mounted on the locking rod and having a movable pin operationally engaging the pin hole, and with a holding device formed at one end of the locking rod;

a retractable rod which is hollow, received in the locking rod and has two ends, with a loop lock attached to one end and a joint block attached to the other end of the retractable rod;

an interior shaft accommodated inside the retractable rod and having two ends, with an abutting head attached to one end and a cap with claws attached to the other end of the interior shaft;

a restitution device mounted on the other end of the locking rod; and a handle clamping the restitution device with the locking rod and combined with the locking base to slide along the locking rod.

By setting the holding device and the loop lock, the steering wheel lock firmly attaches at two sides of a steering wheel.

Further benefits and advantages of the present invention will become apparent after a careful reading of the detailed description with appropriate reference to the accompanying drawings.

BRIEF DESCRIPTION OF THE DRAWINGS

FIG. 4A is a enlarged, partially cross-sectional side view of a loop lock as shown in the A portion in FIG. 4;

FIG. 4B is a enlarged, partially cross-sectional side view of a restitution device as shown in the B portion in FIG. 4;

FIGS. 9 and 9A are respective side and top views of the steering wheel lock in FIG. 8;

FIGS. 10 and 10A are respective side and top views of another preferred embodiment of the steering wheel lock in accordance with the present invention; and FIGS. 11 and 11A are respective side and top views of still another preferred embodiment of the steering wheel lock in accordance with the present invention.

DETAILED DESCRIPTION OF THE PREFERRED EMBODIMENT

A steering wheel lock in accordance with the present invention comprises a hollow locking shaft with two hooks, a locking base slidably mounted on a middle section of the locking shaft and having a bar corresponding to the two hooks, a retractable rod engaged with the locking rod and having a positioning device at one end and a loop lock at the other end, and an interior shaft received inside the retractable rod and having an abutting head at one end and a clamping device at the other end. Thereby, the positioning device is secured by the clamping device on the interior shaft in a normal condition so that the retractable rod is temporarily fixed without sliding. Moreover, the loop lock and the hooks on the locking rod are respectively and detachably mounted on two opposite sides of the steering wheel to provide excellent burglarproof efficiency.

Figure 1:
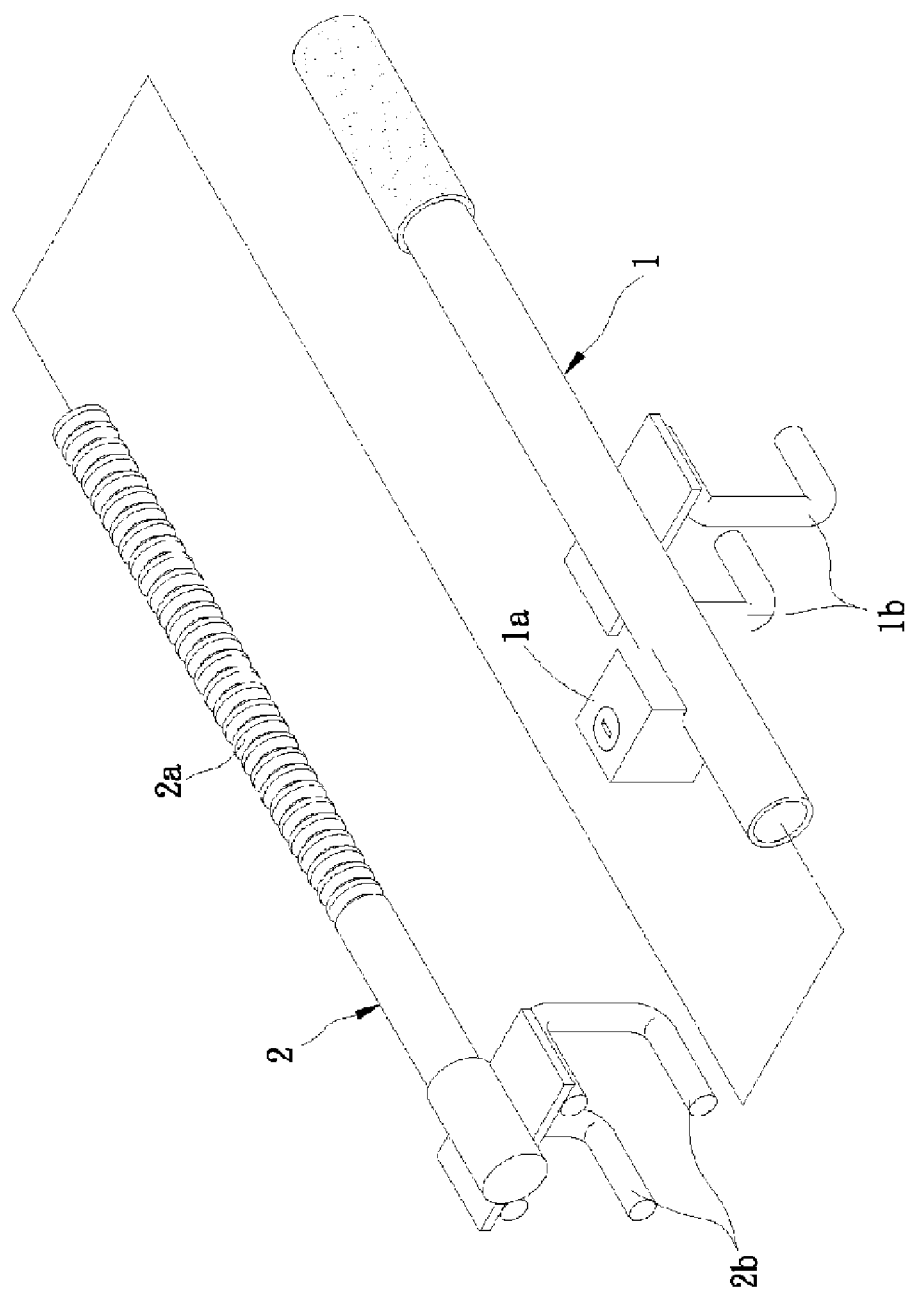
FIG. 1 is an exploded perspective view of a conventional steering wheel lock in accordance with the prior art.
Figure 2:
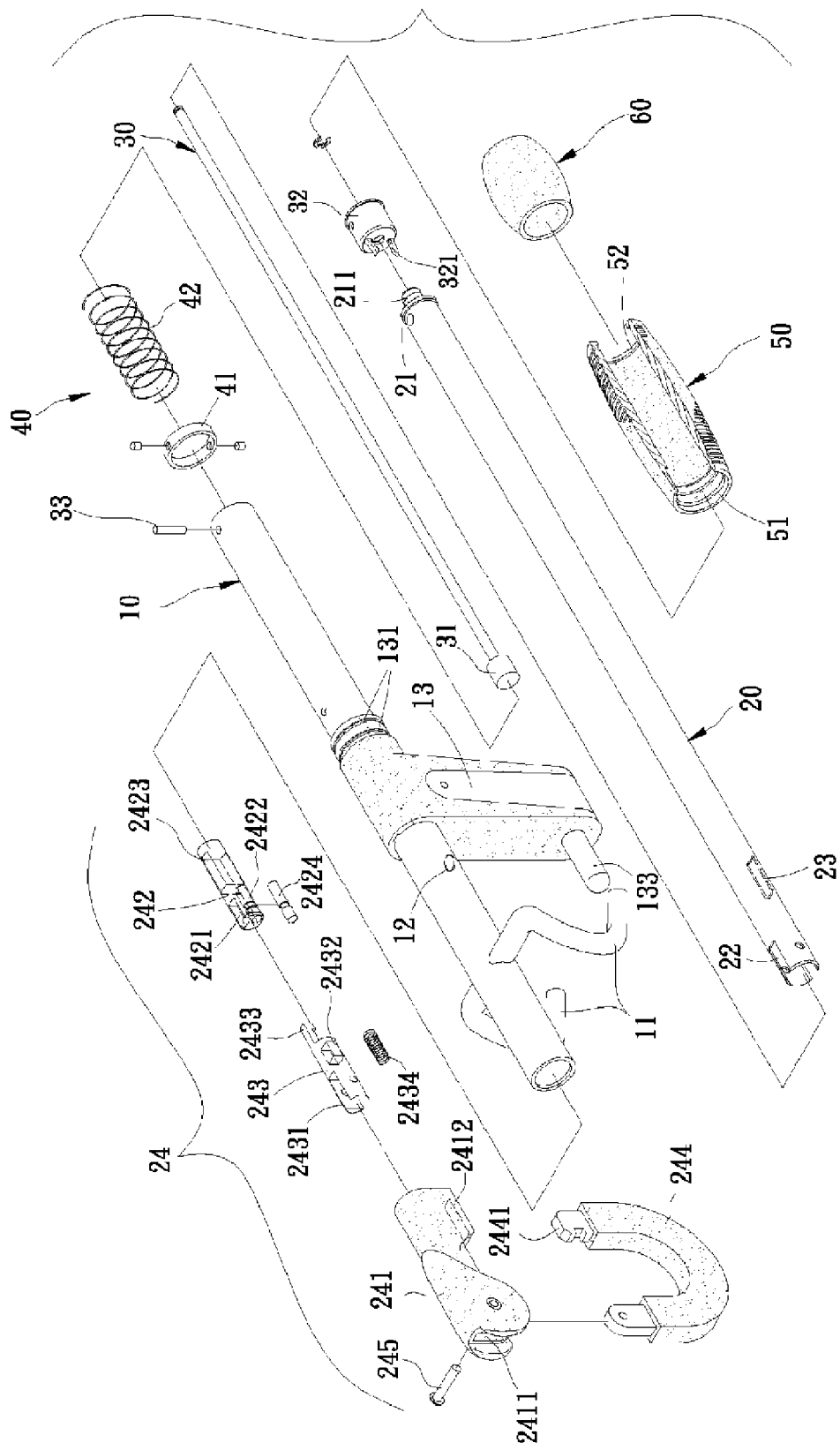
FIG. 2 is an exploded perspective view of a preferred embodiment of a steering wheel lock in accordance with the present invention.
Figure 3:
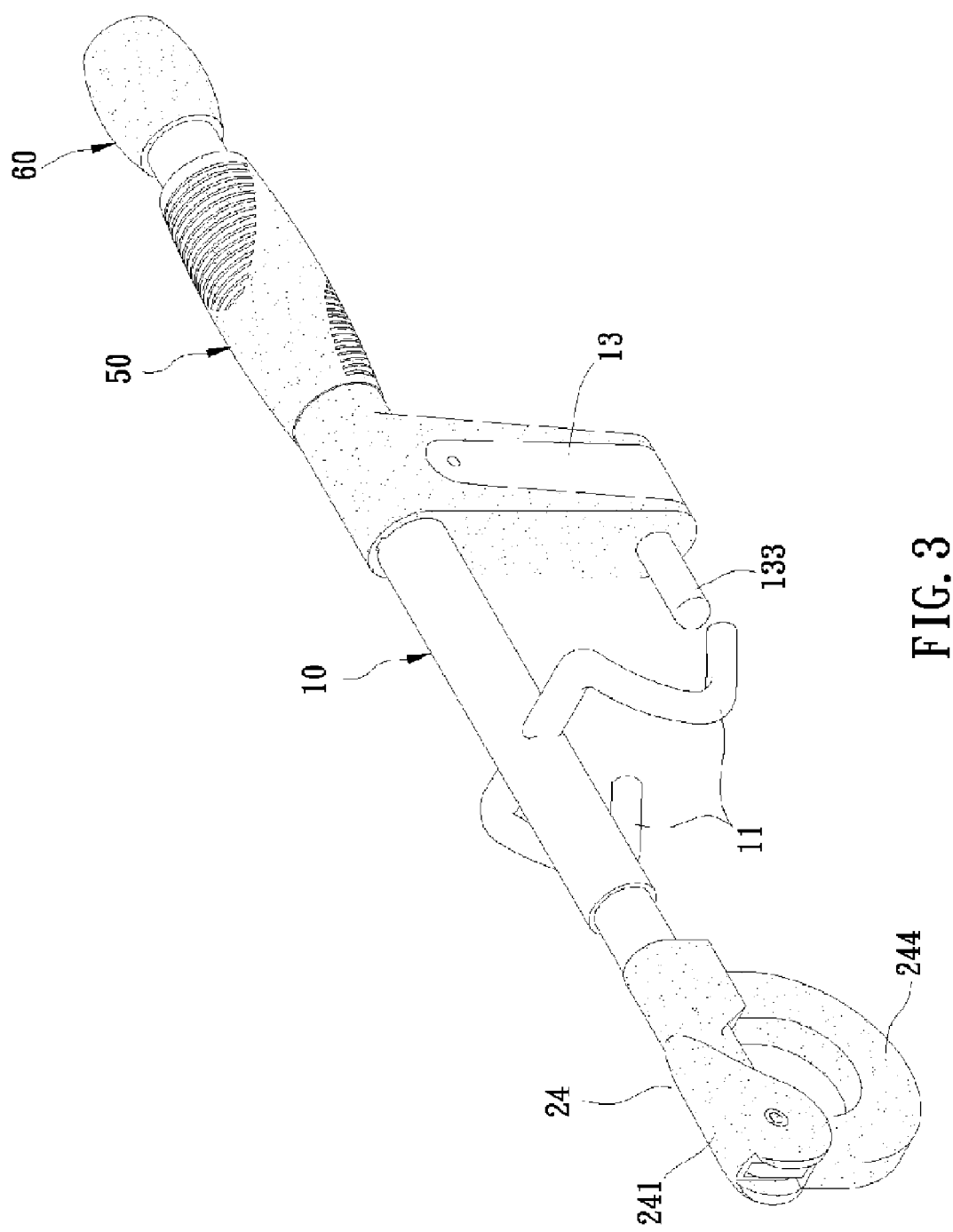
FIG. 3 is a perspective view of the steering wheel lock in accordance with FIG. 2, where the steering wheel lock is assembled.
Figure 4:
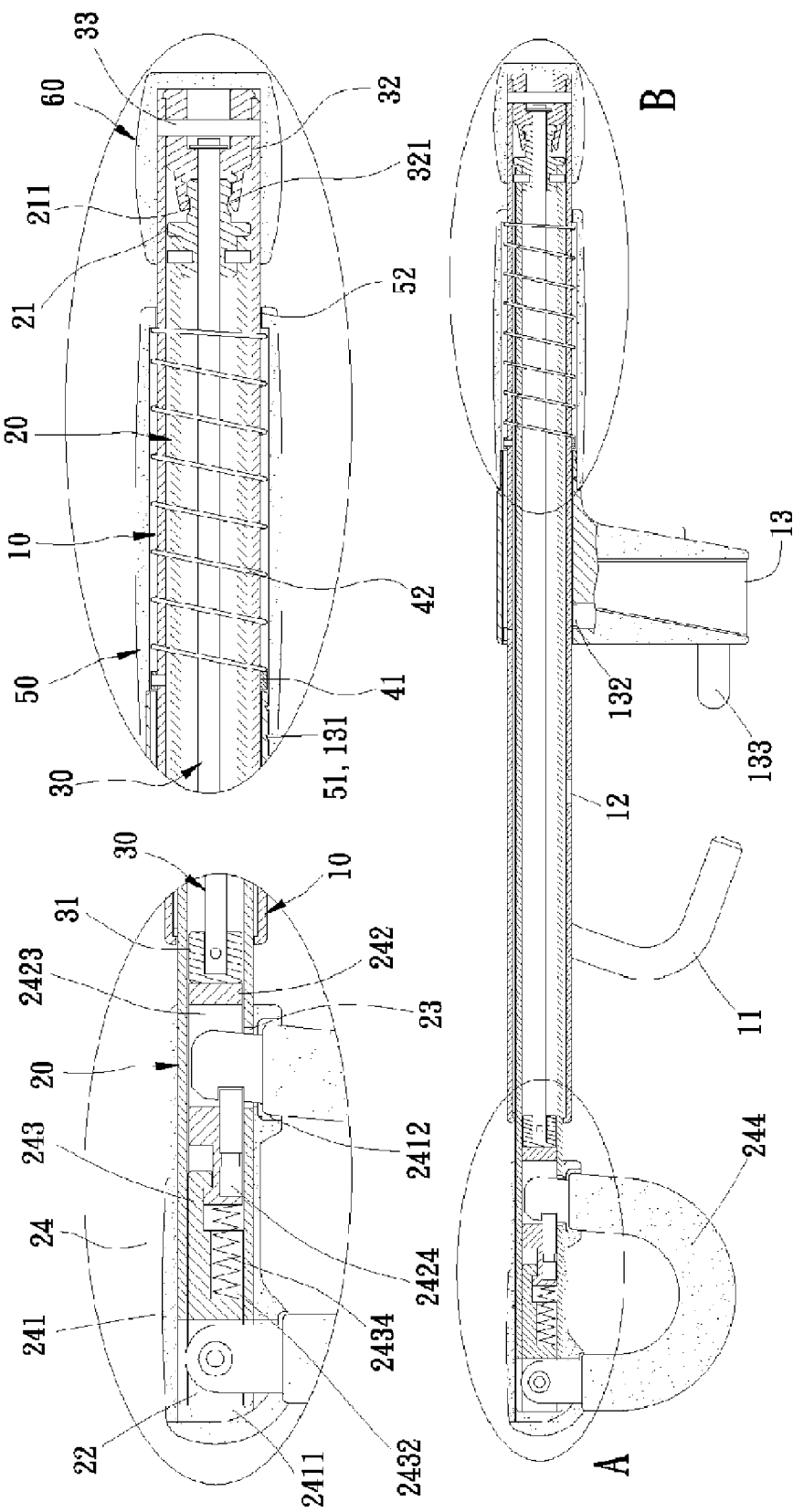
FIG. 4 is a partially cross-sectional side view of the steering wheel lock in FIG. 3.
Figure 5:
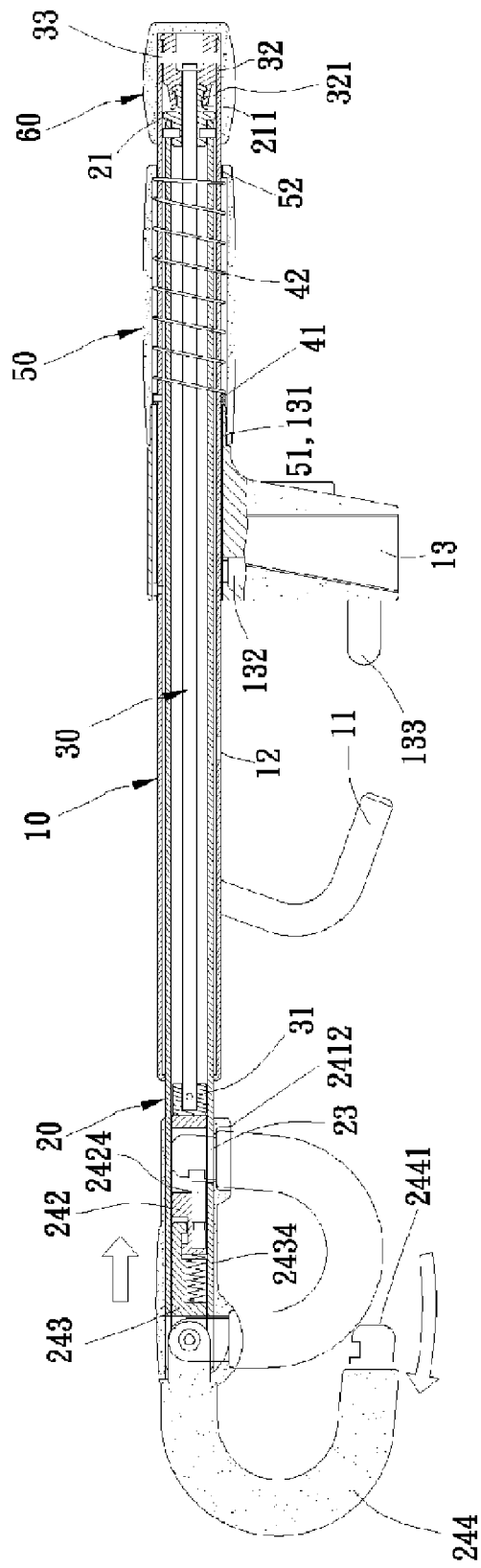
FIG. 5 is an operationally and partially cross-sectional side view of the steering wheel lock showing movement of the loop lock.
Figure 6:
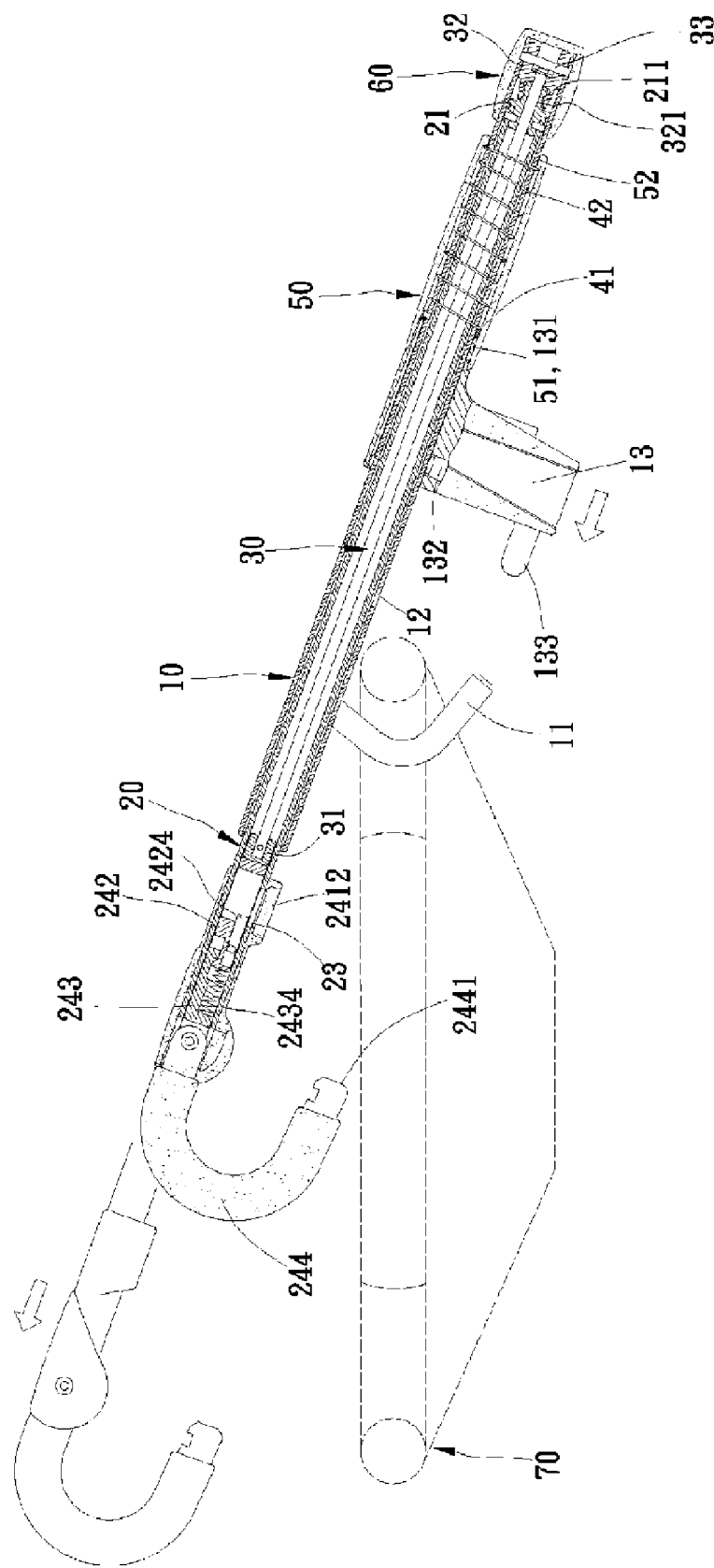
FIG. 6 is an operationally and partially cross-sectional side view of the steering wheel lock showing attachment to a steering wheel.
Figure 7:
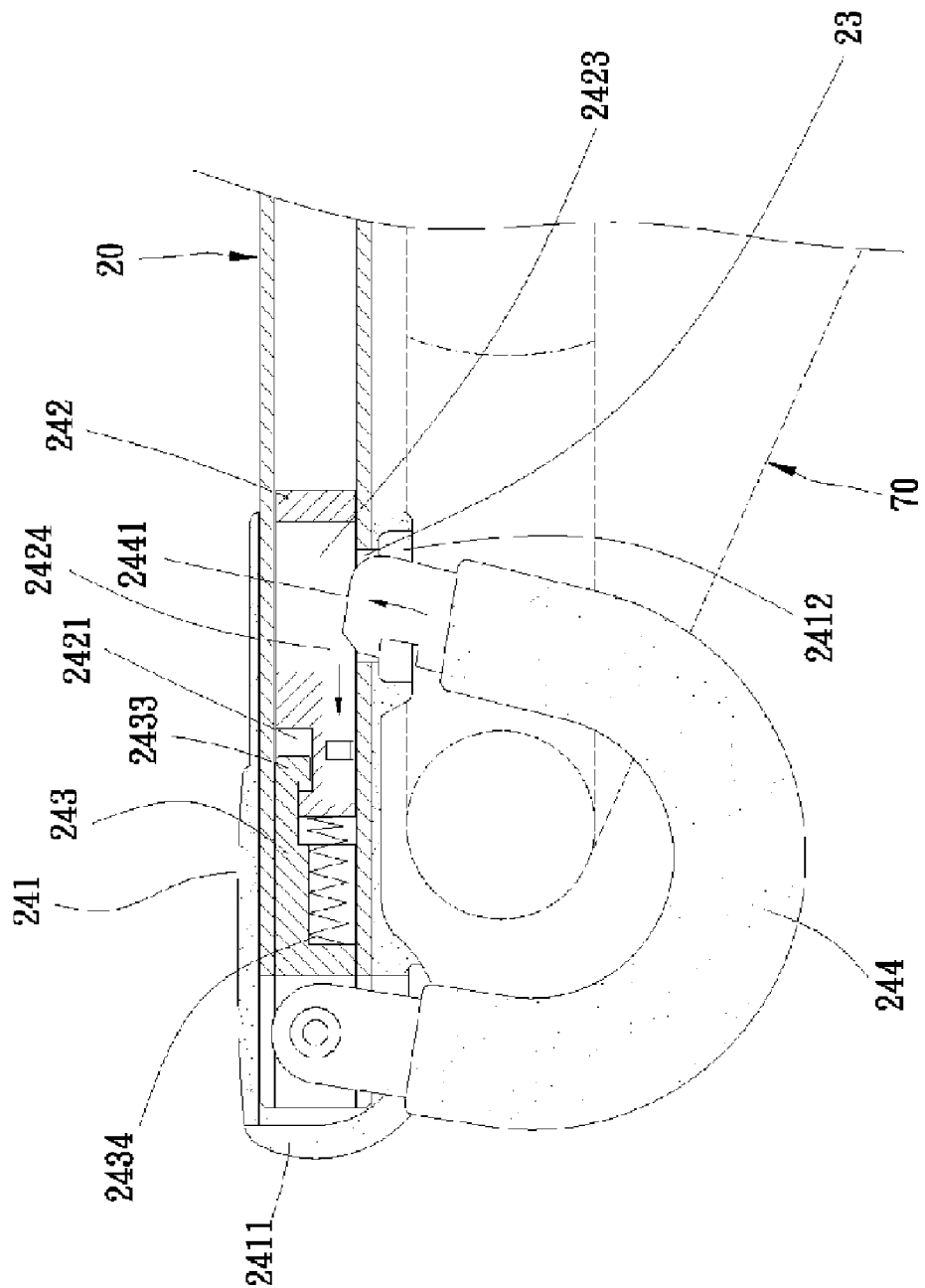
FIG. 7 is an operationally and partially enlarged cross-sectional side view showing engagement of the loop lock.
Figure 8:
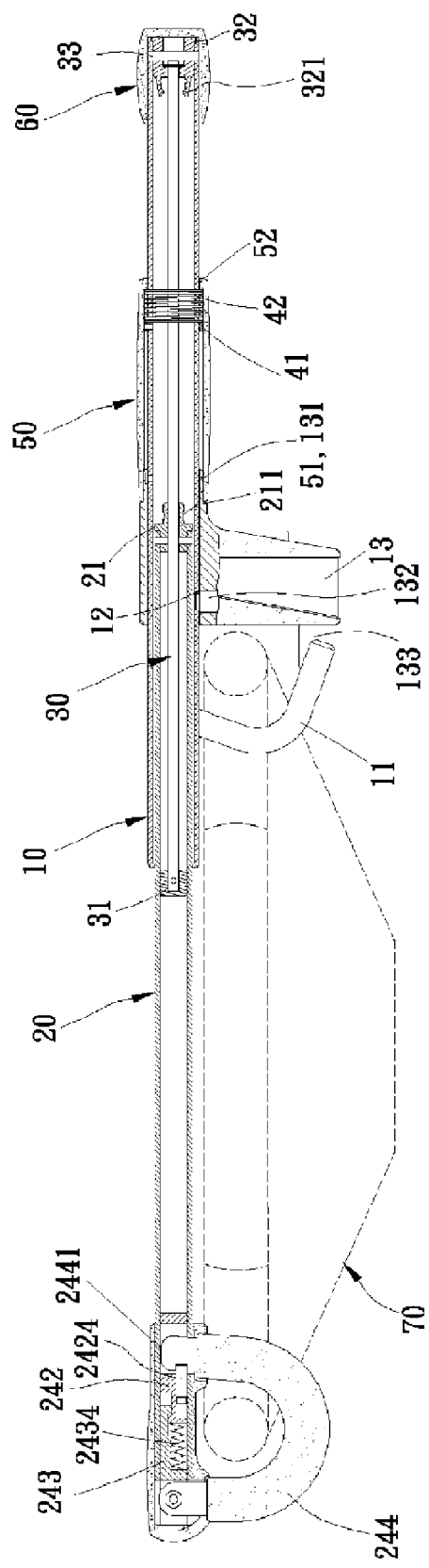
FIG. 8 is a partially cross-sectional side view of the steering wheel lock showing the final combination with the steering wheel.

With reference to FIGS. 2 to 4, a preferred embodiment of the steering wheel lock comprises a locking rod 10, a retractable rod 20, an interior shaft 30, a restitution device 40, a handle 50 and a plastic sleeve 60.

The locking rod 10 is hollow and has two ends, with two hooks 11 extending downward at one end. A pin hole 12 is defined in a middle portion of the locking rod 10. A locking base 13 is slidably mounted on the locking rod 10 and has a movable pin 132 driven by a key (not shown) to operationally engage the pin hole 12. Moreover, the locking base 13 has two grooves 131 defined on its periphery and a bar 133 extending toward and operationally located between the two hooks 11. Moreover, other holding devices selectively substitute for the two hooks 11 in other embodiments.

The retractable rod 20 is also hollow and penetrates the locking rod 10. The retractable rod 20 has one end combined with a joint block 21 with an enlarged stub 211 and the other end defined with an edge cutout 22 and a lock hole 23 to engage a loop lock 24. The joint block 21 of the retractable rod 20 has an axial hole for the interior shaft 30.

With further reference to FIG. 4A, the loop lock 24 is composed of a retaining base 241, an engaging piece 242, a limitation piece 243 and a U-frame 244. The retaining base 241 is mounted to a corresponding end having the edge cutout 22 on the retractable rod 20. The retaining base 241 has two ends, a pivotal recess 2411 defined in one end and a through hole 2412 defined in the other end. The engaging piece 242 is received inside the retractable rod 20. The engaging piece 242 has two ends, an elongated detent 2421 defined on a top face of one end, a pin channel 2422 transversally defined under the elongated detent 2421 and an insertion hole 2423 defined in the other end to align with the lock hole 23 on the retractable rod 20. The pin channel 2422 receives a locking pin 2424 that operationally extends into the insertion hole 2423. The limitation piece 243 is received inside the retractable rod 20. The limitation piece 243 has two ends, two arms 2431 formed at one end, and a spring recess 2432 defined in the other end. A hook arm 2433 is formed to engage the elongated detent 2421 on the engaging piece 242, and a spring 2434 is received inside the spring recess 2432 to abut the locking pin 2424. The U-frame 244 has a pivotal end and an insertion end 2441. The pivotal end is pivotally clamped between the two arms 2431 of the limitation piece 243, is received inside the pivotal recess 2411 on the retaining base 241 and, then, is secured by inserting a rivet 245 through the retaining base 241, the retractable rod 20, the arms 2431 on the limitation piece 243 and the pivotal end so that the U-frame 244 pivots on the retractable rod 20. The insertion end 2441 penetrates the lock hole 23 and the through hole 2412, is received inside the insertion hole 2423 and has a notch operationally engaging the locking pin 2424 of the loop lock 24.

With further reference to FIG. 4B, the interior shaft 30 penetrates the retractable rod 20. The interior shaft 30 has two ends, an abutting head attached to one end and a clamping device, such as a cap 32 with two claws 321, mounted on the other end. The cap 32 is mounted to the other end of the locking rod 10 and secured on the locking rod 10 by inserting a pin 33. The two claws 321 operationally clamp the enlarged stub 211 on the joint block 21 of the retractable rod 20.

The restitution device 40 is composed of a stop ring 41 mounted on periphery of the other end of the locking rod 10 and a restitution spring 42 sleeving around the periphery of the locking rod 10.

The handle 50 covers the restitution device 40 and has an inner edge and an outer edge. The inner edge has two annular ribs 51 engaged with the grooves 131 on the locking base 13 so that the handle 50 slides along the locking rod 10 with the locking base 13. The outer edge has an inner rim 52 that clamps the restitution spring 42 with the stop ring 41. Moreover, the stop ring 41 also limits the extension movement of the locking base 13.

The plastic sleeve 60 is attached to the other end of the locking rod 10 to enclose the cap 32 inside the locking rod 10.

With reference to FIGS. 5 to 9, when the steering wheel lock operates, the retractable rod 20 is pushed toward the locking rod 10 to a terminal retracting position. When the abutting head 31 pushes the engaging piece 242 to press the spring 2434, the locking pin 2424 disengages from the insertion end 2441 on the U-frame 244. Therefore, the U-frame 244 can be pivotally and outwardly moved to open the loop lock 24. Then, the locking rod 10 is inclined to allow the hooks 11 to embrace an inner side on one end of the steering wheel 70. The retractable rod 20 is extended again to a desired length until the U-frame 244 operationally loops an opposite end of the steering wheel 70 by resetting the insertion end 2441 of the U-frame 244 into the retaining base 241. The spring 2434 pushes the engaging piece 242 to insert the locking pin 2424 into the notch of the insertion end 2441 again for locking the loop lock. After securing the loop lock on the steering wheel 70, locking base 13 with the handle 50 is pushed toward the hooks 11 to compress the restitution spring 42 until the movable pin 132 on the locking base 13 engages the pin hole 12 on the locking rod 10. Meanwhile, the bar 133 on the locking base 13 is inserted between the two hooks 11 to enclose the side of the steering wheel 70 to achieve the attachment of the steering wheel lock.

When the steering wheel lock is detached from the steering wheel 70, the locking base 13 is unlocked by a key to retract the movable pin 132 from the pin hole 12 so that the locking base 13 with the handle 50 is pushed outward by the force of the restitution spring 42 to release the side of the steering wheel 70. Then, the locking rod 10 is lifted up at the handle 50 to completely disengage the hooks 11 from the steering wheel 70. After disengaging the hooks 11, the locking rod 10 is pushed toward the loop lock 24 secured on the steering wheel 70 to press the abutting head 31 on the interior shaft 30 against the engaging piece 242 again so that the locking pin 2424 detaches from the insertion end 2441 of the U-frame 244 to unlock the loop lock 24. Thereby, the steering wheel lock is completely detached from the steering wheel 70.

With reference to FIGS. 10 and 10A, another embodiment of the steering wheel lock in accordance with the present invention has a similar structure in comparison with the former embodiment except the hooks 11 are substituted by an inverted U-base 11'.

With reference to FIGS. 11 and 11A, still another embodiment of the steering wheel lock in accordance with the present invention has a similar structure in comparison with the former embodiment except the hooks 11 are substituted by a cover 11" with an outer flange 111" and an inner flange 112".

According to above description, the steering wheel lock of the present invention has the following advantages:

1. The retractable rod 20 can be retained by combining the enlarged stub 211 of the joint block 21 with the claws 321 on the cap 32 of the interior shaft 30 to keep the retractable rod 20 from sliding when the steering wheel lock is not in use.

2. The steering wheel lock of the present invention can be attached without the key, because the locking pin 2424 automatically engages the U-frame 244 by the pushing force of the spring 2434. Therefore, attachment operation of the steering wheel lock is convenient.

3. The steering wheel lock respectively holds the steering wheel 70 at two ends, with one end enclosed in the loop lock 24 and the other end clamped between the hooks 11 or the like and the bar 133. By securing at the two ends of the steering wheel 70 axial hammering force to the locking rod 10 can be compensated by the steering wheel 70. Therefore, the steering wheel lock is durable and has excellent burglarproof efficiency.

Although this invention has been described in its preferred forms with a certain degree of particularity, it is understood that the present invention of the preferred forms has been made only by way of example and that numerous changes in the details of construction and the combination and arrangement of parts may be resorted to without departing from the spirit and scope of the invention.

What is claimed is:

1. A steering wheel lock comprising:
   a locking rod, with the locking rod being hollow and having two ends, with a pin hole defined in a middle of the locking rod, with a locking base slidably mounted on the locking rod and having a movable pin operationally engaging the pin hole, and with a holding device formed at one end of the locking rod;
   a retractable rod, with the retractable rod being hollow, received in the locking rod and having two ends, with a loop lock attached to one end of the retractable rod and a joint block attached to the other end of the retractable rod, wherein the retractable rod has an edge cutout and a lock hole defined in the end to which the loop lock is attached;
   an interior shaft accommodated inside the retractable rod and having two ends, with an abutting head attached to one end of the interior shaft and a cap with claws attached to the other end of the interior shaft;
   a restitution device mounted on the other end of the locking rod; and
   a handle clamping the restitution device with the locking rod and combining with the locking base to slide with the locking base along the locking rod, wherein the loop lock comprises:
   a retaining base mounted on the retractable rod and having two ends, with a pivotal recess defined in one end of the retaining base and a through hole defined in a bottom face of the other end of the retaining base to align with the lock hole on the retractable rod;
   an engaging piece received inside the retractable rod and having two ends, with an elongated detent defined on a top face of one end of the engaging piece, a passageway defined below the elongated detent, and an insertion hole defined in the other end of the engaging piece to align with the through hole on the retaining base, wherein a locking pin is received inside the passageway and extends into the insertion hole;
   a limitation piece received inside the retractable rod and having two ends, with two arms extending from one end of the limitation piece and received inside the pivotal recess, a spring recess defined in the other end of the limitation piece to accommodate a spring therein, and a hook arm extending from the other end of the limitation piece to engage the elongated detent on the engaging piece; and
   a U-frame having a pivotal end pivotally attached to the limitation piece and the retaining base and an insertion end operationally engaging the insertion hole and secured by the locking pin of the engaging piece.

2. The steering wheel lock as claimed in claim 1, wherein two grooves are defined on a periphery of the locking base and two ribs are formed on an inner periphery of the handle to respectively engage the two grooves of the locking base.

3. The steering wheel lock as claimed in claim 1, wherein the joint block of the retractable rod has an axial hole penetrated by the interior shaft.

4. The steering wheel lock as claimed in claim 1, wherein the joint block has an enlarged stub extending out of the retractable rod and clamped by the claws of the cap to keep the retractable rod from sliding.

5. The steering wheel lock as claimed in claim 1, wherein the restitution device comprises:
   a stop ring mounted on a periphery of the other end of the locking rod to limit movement of the locking base; and
   a restitution spring sleeving around the periphery of the locking rod;
   wherein the handle further has an inner rim to clamp the restitution spring with the stop ring.

6. The steering wheel lock as claimed in claim 1, wherein the holding device comprises two hooks.

7. The steering wheel lock as claimed in claim 1, wherein the holding device comprises an inverted U-base.

8. The steering wheel lock as claimed in claim 1, wherein the holding device comprises a cover with an inner flange and an outer flange.

* * * * *